(12) United States Patent
Sugano et al.

(10) Patent No.: US 7,212,972 B2
(45) Date of Patent: May 1, 2007

(54) AUDIO FEATURES DESCRIPTION METHOD AND AUDIO VIDEO FEATURES DESCRIPTION COLLECTION CONSTRUCTION METHOD

(75) Inventors: Masaru Sugano, Tokyo (JP); Yasuyuki Nakajima, Saitama (JP); Hiromasa Yanagihara, Saitama (JP); Akio Yoneyama, Tokyo (JP); Haruhisa Kato, Tokyo (JP)

(73) Assignee: DDI Corporation, Tokyo (JP)

( * ) Notice: Subject to any disclaimer, the term of this patent is extended or adjusted under 35 U.S.C. 154(b) by 1044 days.

(21) Appl. No.: 09/730,607

(22) Filed: Dec. 7, 2000

(65) Prior Publication Data

US 2001/0003813 A1 Jun. 14, 2001

(30) Foreign Application Priority Data

Dec. 8, 1999 (JP) ......................................... 11-349147
Dec. 8, 1999 (JP) ......................................... 11-349148

(51) Int. Cl.
*G10L 15/00* (2006.01)

(52) U.S. Cl. ........................................ 704/500; 715/713
(58) Field of Classification Search ................. 704/500, 704/503; 345/712, 328; 715/713
See application file for complete search history.

(56) References Cited

U.S. PATENT DOCUMENTS 5,737,308 A * 4/1998 Nakai et al. ............. 369/275.2
5,864,870 A * 1/1999 Guck .......................... 707/104
6,199,076 B1 * 3/2001 Logan et al. .............. 715/501.1
6,236,395 B1 * 5/2001 Sezan et al. ................. 345/328
6,411,724 B1 * 6/2002 Vaithilingam et al. ...... 382/100
6,714,909 B1 * 3/2004 Gibbon et al. .............. 704/246

OTHER PUBLICATIONS

Kuboki et al.; "Method of Making Metadata for TV Production Using General Event List (GEL)"; ITE Technical Report, vol. 23, No. 28, Mar. 1999, pp. 1–6.
Hashimoto et al.; "Digested TV Program Viewing Application Using Program Index", ITE Technical Report, vol., 23, No. 28, Mar. 1999, pp. 7–12.
Kuboki et al.; "Method of Making Metadata for TV Production Using General Event List (GEL)"; ITE Technical Report, vol. 23, No. 28, Mar. 1999, pp. 1–6.
Hashimoto et al.; "Digested TV Program Viewing Application Using Program Index", ITE Technical Report, vol., 23, No. 28, Mar. 1999, pp. 7–12.
Japanese Patent Office Action for corresponding Japanese Patent Application No. 11-349148 dated Jan. 14, 2005.

* cited by examiner

*Primary Examiner*—Daniel Abebe
(74) *Attorney, Agent, or Firm*—Armstrong, Kratz, Quintos, Hanson & Brooks, LLP

(57) ABSTRACT

A feature description method capable of high-speed, efficiently searching audio data or grasping a summary of the audio data by giving considerations to elements and characteristics peculiar to the audio data, is provided. Also, an audio video data feature description collection construction method for collecting feature descriptions from multiple pieces of audio video data based on a specific feature type makes it possible to efficiently, clearly describe a feature description collection.

24 Claims, 15 Drawing Sheets

Fig. 6

| "PROGRAM" (MUSIC PROGRAM) | AUDIO DATA TYPE ="MIXED" | SCENE 1 (INTERVIEW) | SCENE 2 (VOCAL) | .... |
|---|---|---|---|---|
| "SCENE" (VOCAL SCENE 1) | AUDIO DATA TYPE ="MUSIC" | SHOT 1 (MELODY 1) | SHOT 2 (MELODY 2) | .... |
| "SHOT" (MELODY 2) | AUDIO DATA TYPE ="MUSIC" | AUDIO SEGMENT 1 | AUDIO SEGMENT 2 | .... |
| "AUDIO CLIP" | AUDIO DATA TYPE | AUDIO SEGMENT 1 | AUDIO SEGMENT 2 | .... |

Fig. 7

FEATURE TYPE="KEY AUDIO CLIP"

(a) 
| "KEY AUDIO CLIP" | AUDIO DATA TYPE | KEY AUDIO CLIP 1 | | .... |
|---|---|---|---|---|
| | | AUDIO SEGMENT 1 | AUDIO SEGMENT 2 | |

FEATURE TYPE="KEYWORD"

(b)
| "KEY AUDIO CLIP" (KEYWORD) | AUDIO DATA TYPE | KEYWORD 1 | | | .... |
|---|---|---|---|---|---|
| | | KEYWORD CONTENT | AUDIO SEGMENT 1 | AUDIO SEGMENT 2 | |

FEATURE TYPE="KEY NOTE"

(c)
| "KEY AUDIO CLIP" (KEY NOTE) | AUDIO DATA TYPE | KEY NOTE 1 | | .... |
|---|---|---|---|---|
| | | AUDIO SEGMENT 1 | AUDIO SEGMENT 2 | |

FEATURE TYPE="KEY SOUND"

(d)
| "KEY AUDIO CLIP" (KEY SOUND) | AUDIO DATA TYPE | KEY SOUND 1 | | .... |
|---|---|---|---|---|
| | | AUDIO SEGMENT 1 | AUDIO SEGMENT 2 | |

FEATURE TYPE="KEY STREAM"

(e)
| "KEY STREAM" | STREAM IDENTIFIER | AUDIO DATA TYPE | AUDIO SEGMENT 1 | AUDIO SEGMENT 2 | .... |
|---|---|---|---|---|---|

FEATURE TYPE="KEY OBJECT"

(f)
| "KEY OBJECT" | STREAM IDENTIFIER | AUDIO DATA TYPE | KEY OBJECT CONTENT | AUDIO SEGMENT 1 | AUDIO SEGMENT 2 | .... |
|---|---|---|---|---|---|---|

Fig. 8

(a) FEATURE TYPE="KEY STREAM"

| "KEY STREAM" | STREAM IDENTIFIER ="2" | AUDIO DATA TYPE ="MUSIC" | AUDIO SEGMENT 1 | AUDIO SEGMENT 2 | .... |

(b) FEATURE TYPE="KEY OBJECT"

| "KEY OBJECT" | STREAM IDENTIFIER ="2" | AUDIO DATA TYPE ="MUSIC" | KEY OBJECT CONTENT ="PIANO" | AUDIO SEGMENT 1 | AUDIO SEGMENT 2 | .... |

Fig. 9

(a) FEATURE TYPE="KEY EVENT"

| "KEY EVENT" | AUDIO DATA TYPE | KEY EVENT 1 | | | |
|---|---|---|---|---|---|
| | | KEY EVENT CONTENT | AUDIO SEGMENT 1 | AUDIO SEGMENT 2 | .... |

(b) FEATURE TYPE="AUDIO SLIDE"

| "AUDIO SLIDE" | AUDIO DATA TYPE | AUDIO SEGMENT 1 | AUDIO SEGMENT 2 | AUDIO SEGMENT 3 | .... |

(c)

| "AUDIO SLIDE" | AUDIO DATA TYPE | AUDIO FILE NAME 1 | AUDIO FILE NAME 2 | AUDIO FILE NAME 3 | .... |

(d) FEATURE TYPE="AUDIO THUMBNAIL"

| "AUDIO THUMBNAIL" | AUDIO SEGMENT 1 | AUDIO SEGMENT 2 | AUDIO SEGMENT 3 | .... |

(e)

| "AUDIO THUMBNAIL" | IMAGE FILE NAME 1 | IMAGE FILE NAME 2 | IMAGE FILE NAME 3 | .... |

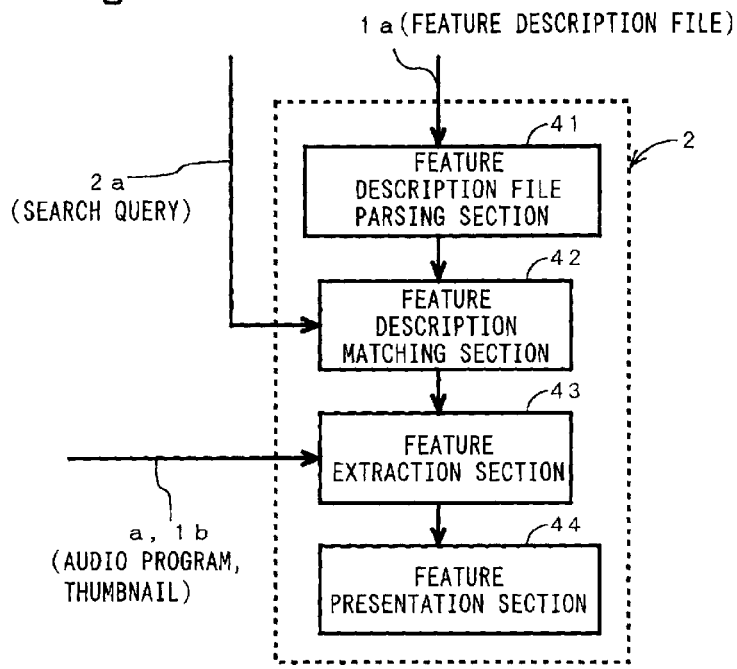

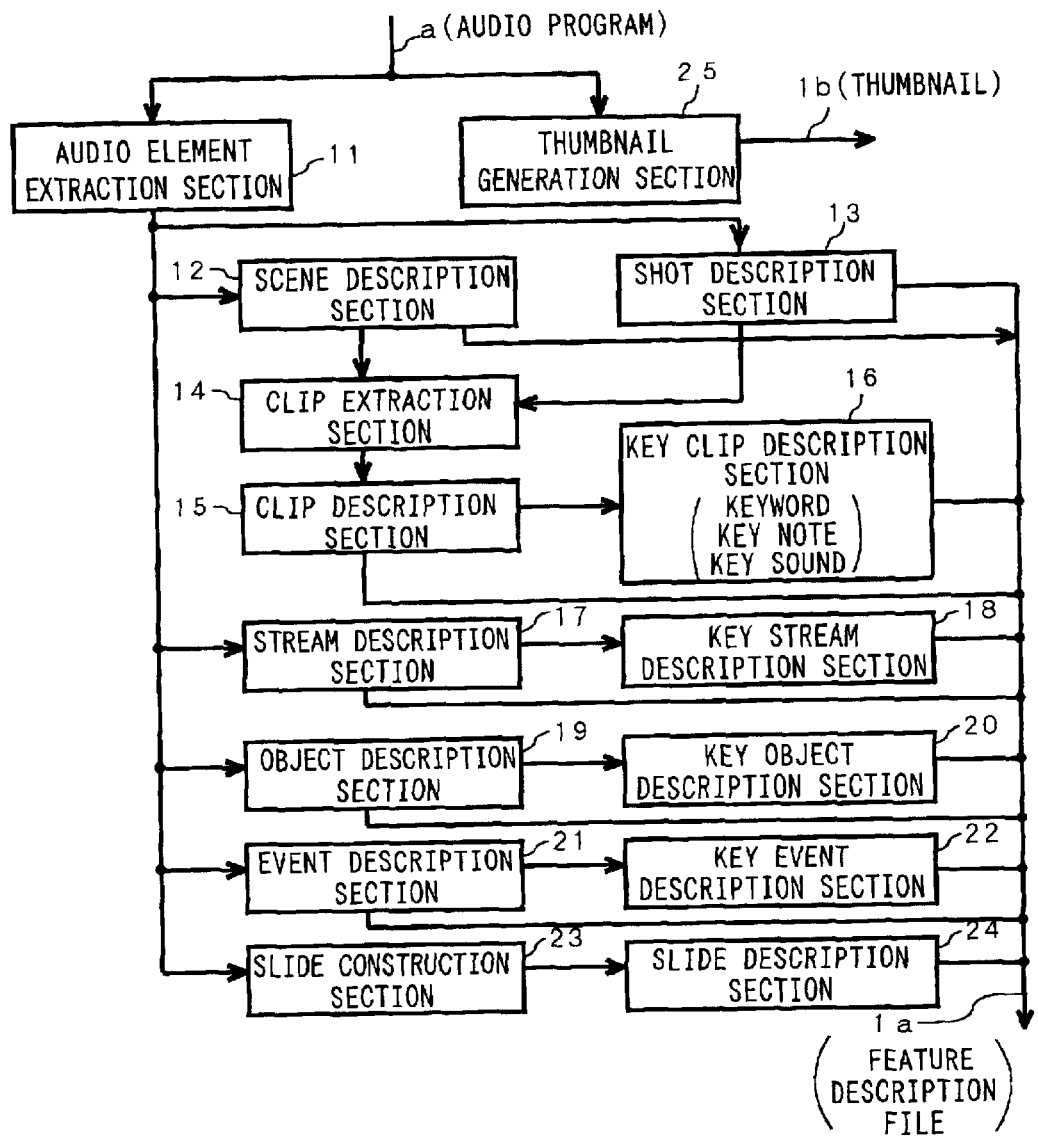

Fig. 16A    PRIOR ART

| FEATURE DESCRIPTION COLLECTION | | | | | | | |
|---|---|---|---|---|---|---|---|
| PROGRAM 1 | | | | PROGRAM 2 | | | |
| FEATURE TYPE 1 | | FEATURE TYPE 2 | | FEATURE TYPE 1 | | FEATURE TYPE 2 | |
| AV SEGMENT 1 | AV SEGMENT 2 | AV SEGMENT 3 | AV SEGMENT 4 | AV SEGMENT 5 | AV SEGMENT 6 | AV SEGMENT 7 | AV SEGMENT 8 |

Fig. 16B    (METHOD BY THIS INVENTION)

| FEATURE DESCRIPTION COLLECTION | | | | | | | |
|---|---|---|---|---|---|---|---|
| FEATURE TYPE 1 | | | | FEATURE TYPE 2 | | | |
| PROGRAM 1 | | PROGRAM 2 | | PROGRAM 1 | | PROGRAM 2 | |
| AV SEGMENT 1 | AV SEGMENT 2 | AV SEGMENT 6 | AV SEGMENT 7 | AV SEGMENT 3 | AV SEGMENT 4 | AV SEGMENT 5 | AV SEGMENT 8 |

AUDIO FEATURES DESCRIPTION METHOD AND AUDIO VIDEO FEATURES DESCRIPTION COLLECTION CONSTRUCTION METHOD

BACKGROUND OF THE INVENTION

1. Field of the Invention

The present invention relates to a method of describing the features of compressed or uncompressed audio data and a method of constructing the feature description collection of compressed or uncompressed audio video data. The audio feature description method is a method of describing an audio feature attached to audio data and enables high-speed, efficiently search and browse audio data at various levels from coarse levels to fine levels. Also, the audio video feature description collection construction method is a method of collecting the feature descriptions of multiple items of audio video data according to a specific feature type, and constructing multiple feature descriptions conforming to the specific feature type as a feature description collection, thereby making it possible to acquire a feature description collection based on the specific feature type from multiple audio video programs.

2. Description of the Related Art

The description of the features of audio data can represent the features of the entire audio data with a small quantity of features by describing or combining the spatial features or frequency features of an audio file existing as a compressed or uncompressed file. The feature description can be employed as an element for grasping the summary of audio data when searching the audio data. The feature description is effective when searching desired audio data from an audio database and browsing the content of the desired audio data.

Conventionally, methods of describing features have been considered mainly for video information. The considerations have been, however, only given to how to represent feature values for audio data. How to combine which feature values so as to describe entire audio data has not been specified or considered yet.

Meanwhile, the description of the features of audio video data has been currently studied at MPEG-7 (Motion Picture Coding Experts Group Phase 7) in ISO (International Organization for Standard). In the MPEG-7, the standardization of content descriptions and description definition languages for allowing efficient search to compressed or uncompressed audio video data is now underway.

In the MPEG-7, feature descriptions from various viewpoints are standardized. Among the feature descriptions, a summary description allowing high-speed, efficient browsing of audio video data is allowed to describe only information for a single audio video in the MPEG-7. As a result of this, summary information according to various summary types on a single audio video program can be constructed and described. Summary types involve important events of the program, important audio clips, video clips and so on.

For example, as shown in FIG. 22A and 22B, for single audio video programs 50 and 51, i.e., complete audio video programs 50 and 51, summary information on various summary types, e.g., "home run", "scoring scene", "base stealing scene" and "strike-out scene", can be described as a summary collection.

As for a summary description, for example, among conventional features descriptions of audio video data, summary information only for a single video audio program can be constructed and described as shown above. However, the construction and description of summary information for multiple audio video programs are not currently specified.

Further, if a feature description collection is described using the feature descriptions of a summary collection from multiple programs in a currently specified framework, e.g., if a feature description collection is described using the feature descriptions of a summary collection from, for example, multiple programs 50, 51, as shown in FIGS. 22A or 22B, then the feature description collection is expected to be described as shown in, for example, FIG. 15A. Namely, it is expected that summary information on the summary collection for each program are simply collected and described.

Consequently, the conventional feature description collection tends to be redundant and unnecessary processings are carried out to search a desired summary from the summary collection, making disadvantageously search time longer. Further, it is difficult to clearly describe the designations of programs to be referred to for each summary. Besides, in case of searching a desired summary from the summary collection, it is difficult to represent a combination of multiple summary types.

SUMMARY OF THE INVENTION

It is, therefore, an object of the present invention to provide a feature description method capable of high-speed, efficiently searching audio data or grasping the summary thereof by giving consideration to elements and features specific to audio data. It is another object of the present invention to provide a method of constructing an audio video feature description collection for collecting the feature descriptions for multiple audio video programs according to a specific feature type to thereby make it possible to efficiently, clearly describe a feature description collection. It is yet another object of the present invention to provide a method of constructing an audio video feature description collection capable of acquiring a desired feature description from a feature description collection by combining multiple feature types.

In order to achieve the above object, the first feature of the present invention is that audio features are hierarchically represented by setting an audio program which means entire audio data constructing one audio program as a highest hierarchy and describing the audio features in a order from higher to lower hierarchies, said hierarchies being represented by at least one audio program having a semantically continuous content and at least one of an audio scene and an audio shot, and said hierarchies being described by at least names of the hierarchies, audio data types, feature types and feature values described by audio segment information classified according to the feature types.

According to these features, compressed or uncompressed audio data can be described hierarchically by using novel method. Besides, it is possible to provide compressed or uncompressed audio feature description capable of high-speed, efficiently searching or inspecting audio data.

The second feature of the invention is that a compressed or uncompressed audio video feature description collection construction method, wherein feature descriptions based on multiple feature types are associated with each audio video program; the feature descriptions are extracted from multiple audio video programs based on a specific feature type; a feature description collection is constructed by using multiple extracted feature descriptions; and the feature description collection is described as a feature description collection file.

And the third feature of the invention is that the feature type is a summary type; summary descriptions associated with the individual audio video programs are extracted from multiple audio video programs based on a specific summary type; a summary collection is constructed using multiple extracted summary descriptions; and the summary collection is described as a summary collection file.

According to the second and third features, the feature descriptions from multiple audio video programs are collected according to a specific information type, therefore the feature description collection can be represented efficiently and clearly. Further, it is possible to combine multiple feature types and to obtain a desired feature description from the feature description collection.

BRIEF DESCRIPTION OF THE DRAWINGS

FIG. 6 is an illustration showing the example of the format shown in FIG. 5 applied to the structure of FIG. 2;

FIG. 7 shows an example of the format of the key audio clip, the key stream and the key object;

FIG. 8 is an illustration showing the key stream and the key object applied to the structure of FIG. 2;

FIG. 9 shows an example of the format of the key event, audio slides and audio thumbnails;

FIG. 10 is a block diagram showing the internal structure of a feature extraction section shown in FIG. 1;

FIG. 11 is a block diagram showing an alternative of the present invention;

FIG. 12 shows an example of the format of the key audio clip attached a level structure;

FIG. 16 shows an example of the description contents of the feature description files obtained by the conventional method and by the method of the present invention in a table form;

DETAILED DESCRIPTION OF THE PREFERRED EMBODIMENTS

The present invention will be described hereinafter in detail with reference to the accompanying drawings. First, the definition of terms used in the present invention will be described.

"Audio program (or audio file)" . . . the entirety of audio data constructing one audio program.

"Audio segment" . . . a group of adjacent audio samples in an audio program.

"Audio scene" . . . temporally and semantically continuous audio segments. Group of audio shots.

"Audio shot" . . . audio segments which are temporally and semantically continuous to adjacent audio segments but which have different characteristic from that of adjacent audio segment. Characteristics involve an audio data type, a speaker type and so on.

"Audio clip" . . . audio segments which are temporally continuous and have one meaning.

"Audio stream" . . . each audio data for each channel or track when the audio data consists of multiple channels or tracks.

"Audio object" . . . audio data source and subject of auditory event. The audio data source of an audio stream is an audio object.

"Audio event" . . . behavior of an audio object in a certain period or an auditory particular event or audio data attached to visual particular event.

"Audio slide" . . . audio data consisting of a sequence of audio pieces or audio programs and obtained by playing these audio pieces or audio programs at certain intervals.

The present invention is based on a conception that audio data is represented by a hierarchical structure. An example of the hierarchical structure will be explained referring to FIG. 2.

Figure 2:
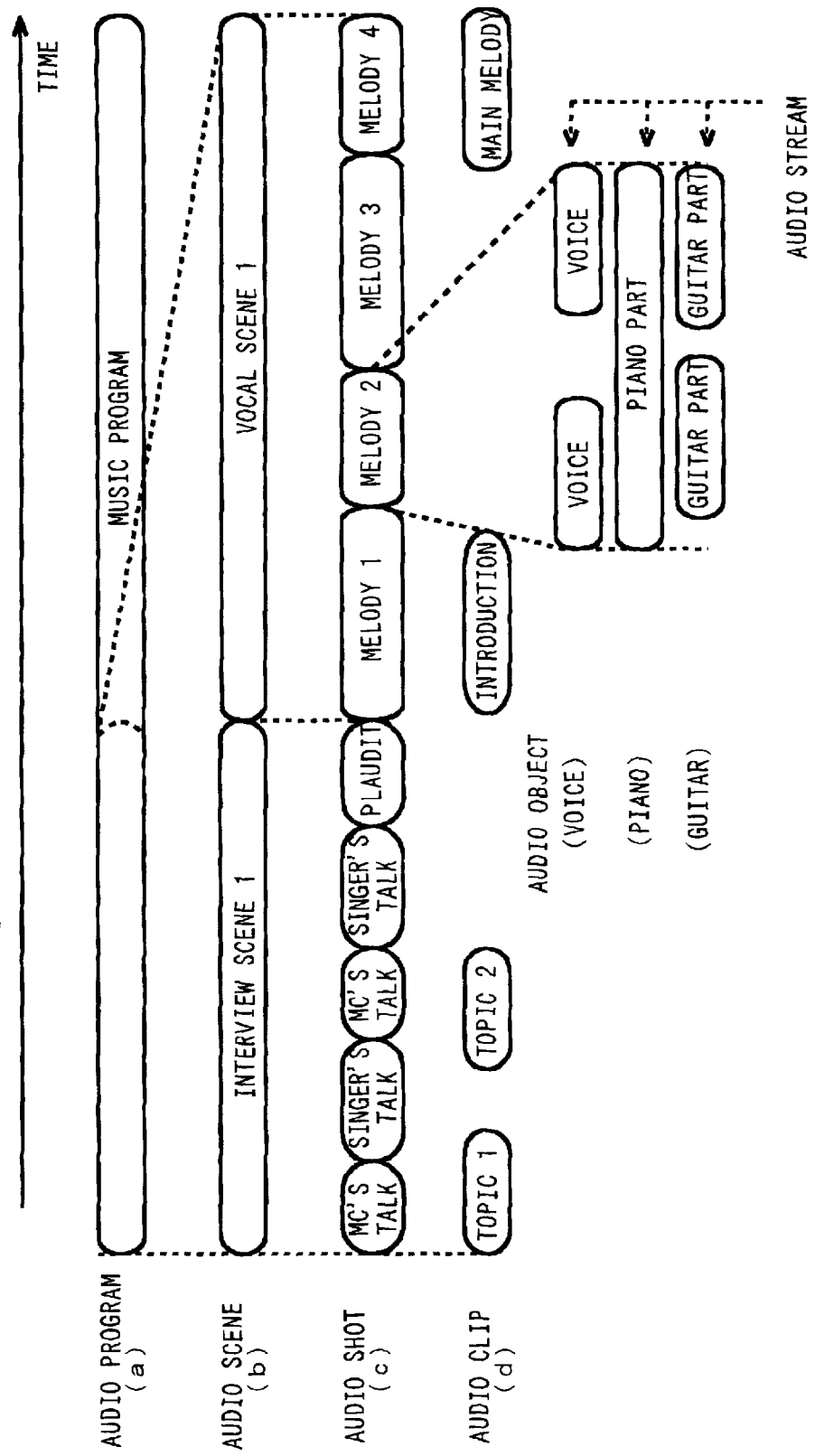
FIG. 2 shows an example of constructing an audio data (music program) hierarchy.

As shown in FIG. 2, a compressed or uncompressed audio program or audio program file (a) (to be referred to as "audio program (a)" hereinafter) (the first hierarchy) which is, for example, a "music program" can be represented by, for example, audio scenes (b) (the second hierarchy) consisting of "interview scene 1" and "vocal scene 1". The "interview scene 1" in the audio scenes (b) can be represented by audio shots (c) (the third hierarchy) consisting of "MC's talks", "singer's talks", . . . , "plaudits" and also the "vocal scene 1" can be represented by the audio shots (c) (the third hierarchy) consisting of "melody 1", . . . , and "melody 4". Also, "topic 1", "topic 2", "introduction" and so on which are distinctive parts extracted from the audio program (a), audio scenes (b) or audio shots (c), can be represented by audio clips (d) (the fourth hierarchy). Further, if the "melody 2", for example, in the audio shots (c) consists of signals of multiple channels or track, the "melody 2" can be represented as audio stream. Each audio stream can be represented as audio objects such as "voice", "piano", "guitar" and so on.

Next, one embodiment of a function which realizes the method of the present invention will be explained referring to FIGS. 1 and 2.

In this embodiment, description will be given to a feature description, among feature descriptions of audio data, relating to summary (outline) for high-speed, efficiently grasping the outline of the audio data.

First, if a compressed or uncompressed audio program or audio file (a) (to be referred to as "audio program (a)" hereinafter) is inputted into a feature description section 1 shown in FIG. 1, as shown in FIG. 2, the audio program (a) is divided into a single or multiple audio scenes (b) which are semantically continuous and the audio scenes (b) are divided and hierarchically structured into a single or multiple audio shots (c). Further, the audio shots are divided into audio clips (d) which have one meaning respectively and described hierarchically. The hierarchies under the audio program (a) are not necessarily essential and are not necessarily ordered as shown above. Thereafter, a feature description file 1a which describes the entire audio program (a), is generated according to a feature type.

These hierarchies are described by at least the names of each hierarchy and/or the feature values thereof. Feature values include feature types, audio data types and audio segment information corresponding to the feature types. The audio segment information is described by any of time codes for start time and end time, time codes for start time and duration, a start audio frame number and an end frame number, or a start frame number and number of frames corresponding to duration. The segmentation of the audio program (a) and structurization into hierarchies can be performed manually or automatically.

Further, the feature description section 1 generates a thumbnail 1*b* for describing the audio program (a) as either audio pieces or images. The thumbnail 1*b* consists of a description indicating a thumbnail, and the segments or file names of the audio pieces or the file names of the images.

The audio program (a), feature description file 1*a* and thumbnail 1*b* are inputted into a feature extraction section 2. The feature extraction section 2 searches the corresponding portion of the feature description file by search query 2*a* from a user and performs feature presentation 2*b*. If the feature type of the search query 2*a* is the thumbnail 1*b*, the thumbnail is presented. If the feature type is a type other than the thumbnail, segments described in the feature description file 1a are extracted from the audio program and presented.

Figure 3:
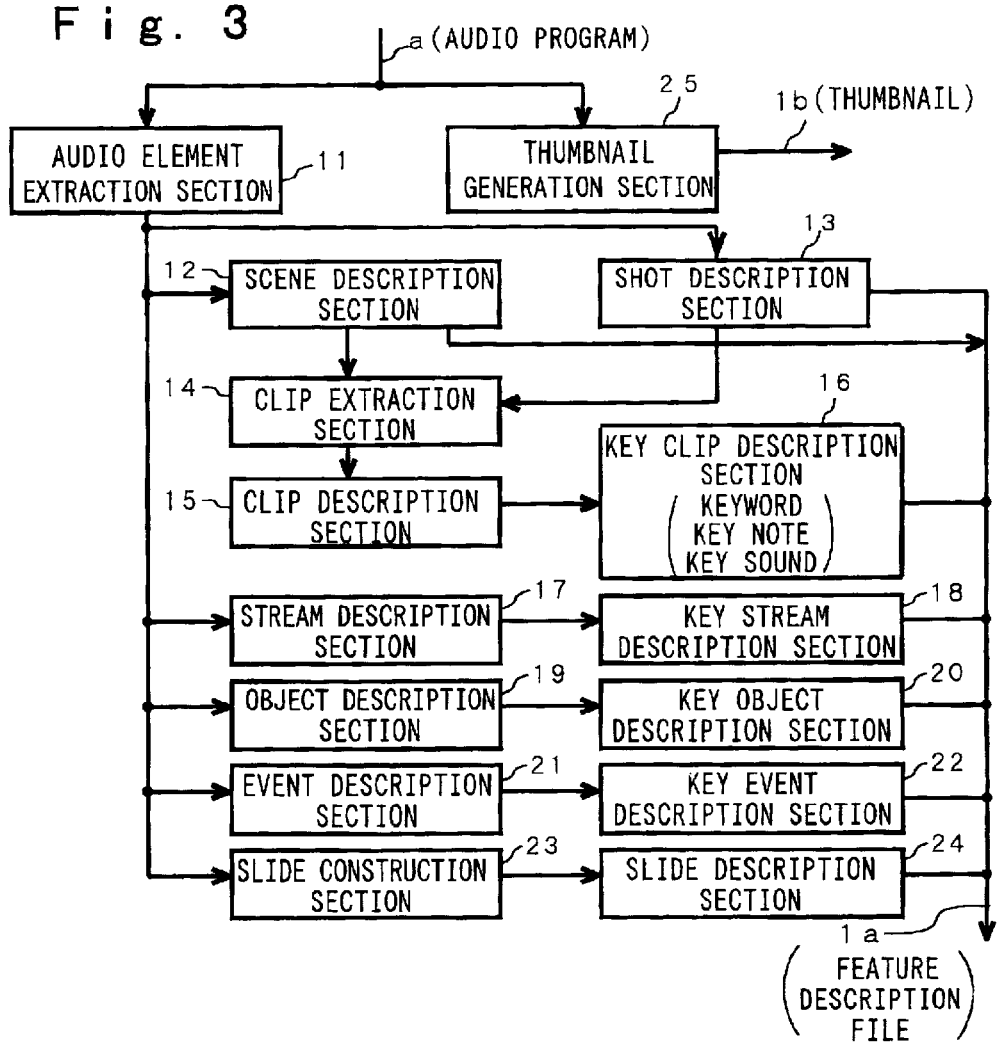
FIG. 3 is a block diagram showing one example of the internal structure of a feature description section shown in FIG. 1.
Figure 4:
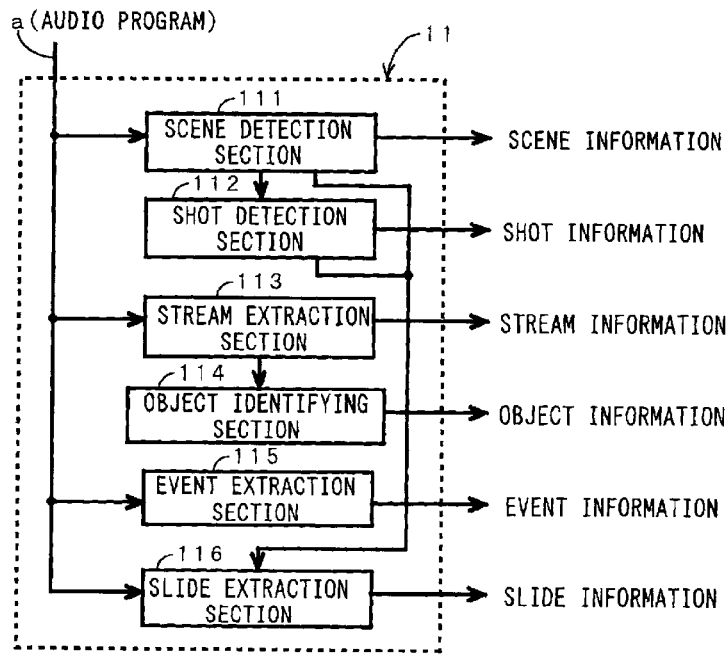
FIG. 4 is a block diagram showing one example of the internal structure of an audio element extraction section shown in FIG. 3.

FIG. 3 is a block diagram showing the internal structure of the feature description section 1. If the audio program (a) is inputted into the feature description section 1, the audio program (a) is fed to an audio element extraction section 11. The internal structure of the audio element extraction section 11 is shown in FIG. 4. The audio program (a) inputted into the audio element extraction section 11 is divided into scenes in a scene detection section 111 and the those scenes are further divided into shots in a shot detection section 112. Scene information and shot information generated from the scene detection section 111 and the shot detection section 112 include indication of scene or shot, and each segment information.

Further, if audio data consists of multiple channels or tracks, a stream extraction section 113 extracts each channel or track as a stream and outputs stream information. Stream information include stream identifiers and segment information for each stream. An object identifying section 114 identifies an object as the audio source of the stream from each audio stream and outputs object information. The objects include, for example, "voice", "piano", "guitar" and so on (see FIG. 2). The object information includes the stream identifier and content of object as well as audio segment information corresponding to the object.

An event extraction section 115 extracts an event representing a certain event from the audio program (a) and generates, as event information, the content of the event and audio segment information corresponding to the event.

A slide extraction section 116 extracts audio pieces which are introductions or representative of the audio program, audio scene or audio shot, and outputs, as slide information, information for each audio piece. The slide information includes segment information if the audio slide components are audio segments, and includes file names if the audio slide components are audio files.

The extraction of each information in the audio element extraction section 11 shown in FIGS. 3 and 4 can be also conducted manually.

The information generated from each section in FIG. 4 are inputted into corresponding description sections shown in FIG. 3. First, the scene information and shot information are inputted into a scene description section 12 and a shot description section 13, respectively. The scene description section 12 and the shot description section 13 describe the types of scenes and shots belonging to the audio program (a), the audio data type and its segment information, respectively. A clip extraction section 14 extracts, as a clip, an audio piece having a certain meaning among the scenes or shots. If necessary, a clip description section 15 declares and describes a clip as the feature type, the audio data type and its segment information.

Figure 5:
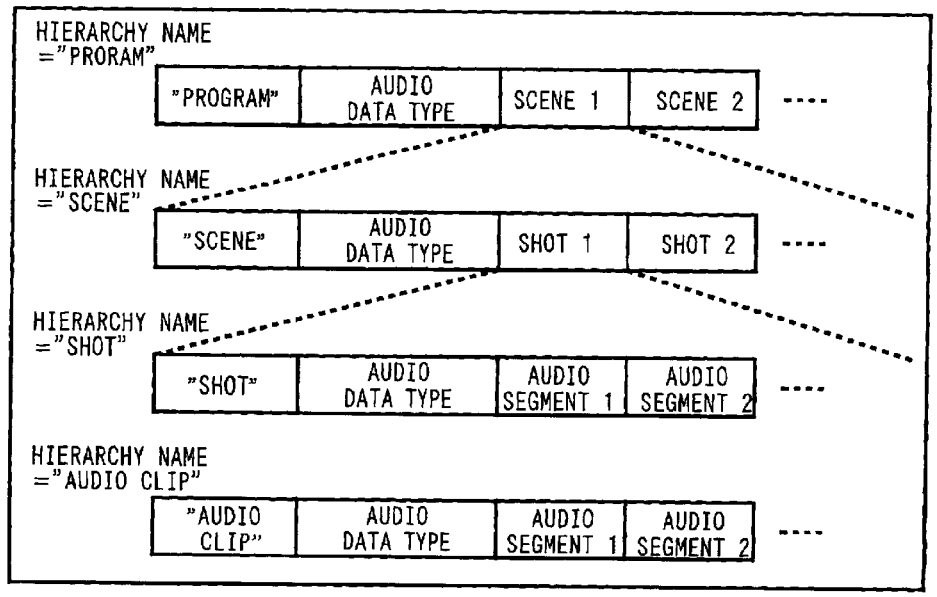
FIG. 5 shows an example of the description format in a scene description section, a shot description section and a clip description section.

FIGS. 5 and 6 shows an example formats of the description in the scene description section 12, the shot description section 13 and the clip description section 15. FIG. 5 shows an example formats represented generally, and FIG. 6 shows an example represented according to the structure of FIG. 2.

As for the clips shown above, a particularly important clip in the program is regarded as the key audio clip. A key clip description section 16 declares and describes a key audio clip as a feature type, as well as the audio data type and its segment information. FIG. 7(*a*) shows an example format for describing the key audio clips.

Further, among the key audio clips, distinctive voice, music and sound are regarded as the keyword, the key note and the key sound, respectively, and a key audio clip is described as a feature type and the audio data type and its segment information are also described. As for the keyword, the content of the speech is simply described as text information. FIGS. 7(*b*), 7(*c*) and 7(*d*) show an example format for describing the key word, the key note and the key sound, respectively. Key words involve, for example, speeches saying such as "year 2000", "Academy Award". Key notes involve, for example, a "main theme" part of music. Key sounds involve, for example, the sound of "plaudits".

Meanwhile, stream information and object information are inputted into a stream description section 17 and an object description section 19 shown in FIG. 3, respectively. Among the streams and objects, particularly important stream and object are regarded as the key stream and the key object, respectively. The feature type of the key stream and that of the key object as well as the audio data type, the contents of feature values and segment information are described by a key stream description section 18 and a key object description section 20, respectively. FIGS. 7(*e*) and 7(*f*) shows an example format for describing the key stream and key object, respectively. FIGS. 8(*a*) and 8(*b*) shows an example format for describing the key stream and key object according to the structure of FIG. 2. The content of the key object is described by text information.

Further, event information is inputted into an event description section 21. A representative event is regarded as the key event. The feature type of the key event, the audio data type, the contents of feature values and segment information are described by a key event description section 22. FIG. 9(*a*) shows an example format for describing the key event. The content of the key event is described by text information. Key events involve, for example, "explosion" and words like "goal" in soccer game program.

Furthermore, slide information is inputted in to a slide construction section 23. The slide construction section 23 constructs an audio slide from multiple audio pieces included in the slide information. The content of the audio slide is described by a slide description section 24. The slide description section 24 describes the type of features, audio segments or the names of files constructing the audio slide. The content of the description relating to the audio slide is also constructed as a feature description file. FIGS. 9(*b*) and 9(*c*) show an example format for describing the audio slide.

In addition, a thumbnail generation section 25 (see FIG. 3) belonging to the same level as that of a program hierarchy section generates a thumbnail 1*b* representing the content of the audio program from the audio program. The thumbnail 1*b* may be represented by a single or multiple audio pieces or as images. FIGS. 9(*d*) and 9(*e*) show an example format for describing the audio thumbnail.

As described above, all the description contents generated from each description section shown in FIG. 3 are components of the feature description file 1*a*.

If the feature type of the audio data is a shot or a key audio clip (including a key word, a key note and a key sound), it is possible to add values indicating hierarchical levels in the same feature type, and to search and browse hierarchically multiple pieces of audio data with the same feature type according to the level values. As an example of describing levels, level 0 is a coarse level and level 1 is a fine level. It is possible to specify audio segments having corresponding feature types for each level. Level information can be specified, for example, between the audio data type and the audio segments as shown in FIGS. 12(*a*) through 12(*d*). Moreover, if the audio segment belonging to the level 0 also belongs to the level 1, the description indicating that situation at the same level as that of the feature type makes it possible to avoid overlapping of audio segments. Thus, it is possible to describe multiple levels according to a common feature type and an audio data type, and to specify audio segments according to level values.

Figure 1:
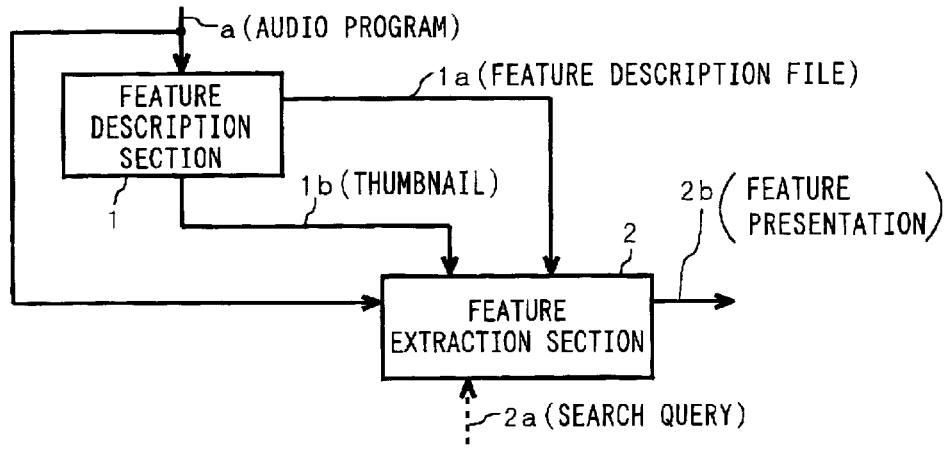
FIG. 1 is a block diagram showing the functionality of one embodiment according to the present invention.

FIG. 10 is a block diagram showing the internal structure of a feature extraction section 2 (see FIG. 1). The audio program (a), the feature description file 1*a* outputted from the feature description section 1, the thumbnail 1*b* and the search query 2*a* as input information from the user are inputted into the feature extraction section 2. First, the feature description file 1*a* is loaded into a feature description file parsing section 41 which parses a feature type, an audio data type, its segment information and so on.

Next, based on the search query 2*a* inputted from the user and information from the feature description file parsing section 41, a feature description matching section 42 searches the feature specified by user and outputs the specified segments of the audio program (a) described as a corresponding feature type.

A feature extraction section 43 extracts audio data according to actual feature values from the audio program (a) based on the specified segments obtained in the feature description matching section 42. At this time, if the feature type specified by the search query is a thumbnail, feature values are not extracted from the audio program (a) but the thumbnail 1*b* is inputted into the feature extraction section 43.

The feature values or thumbnail 1*b* corresponding to the specified segments of the audio program (a) obtained in the feature extraction section 43 is fed into a feature presentation section 44 which plays and displays audio data corresponding to the feature values specified by user.

As can be seen, in this embodiment, using the feature description file 1*a* and/or the thumbnail 1*b* according to the present invention, audio data can be searched and browsed at various levels from the coarse level to the fine level. High-speed, efficient search and browsing can be achieved, accordingly.

FIG. 11 shows an alternative of the present invention. In this alternative, the contents of the clip description section 15, the stream description section 17, the object description section 19 and the event description section 21 are also added to the feature description file 1*a*.

As is obvious from the above description, according to the audio feature description method of the present invention, compressed or uncompressed audio data can be described hierarchically by using a novel method. It is also possible to efficiently describe the features of audio data. Besides, it is possible to provide compressed or uncompressed audio feature description capable of high-speed, efficiently searching or browsing audio data.

Furthermore, by employing the above-stated feature description, it is possible to high-speed, efficiently search or browse audio data at various levels from the coarse level to the fine level when searching the audio data.

Next, another embodiment according to the present invention will be described. In this embodiment, a feature description collection relating to summaries for high-speed, efficiently acquiring the outline of audio video data among the feature description collections for audio video data will be described.

Figure 13:
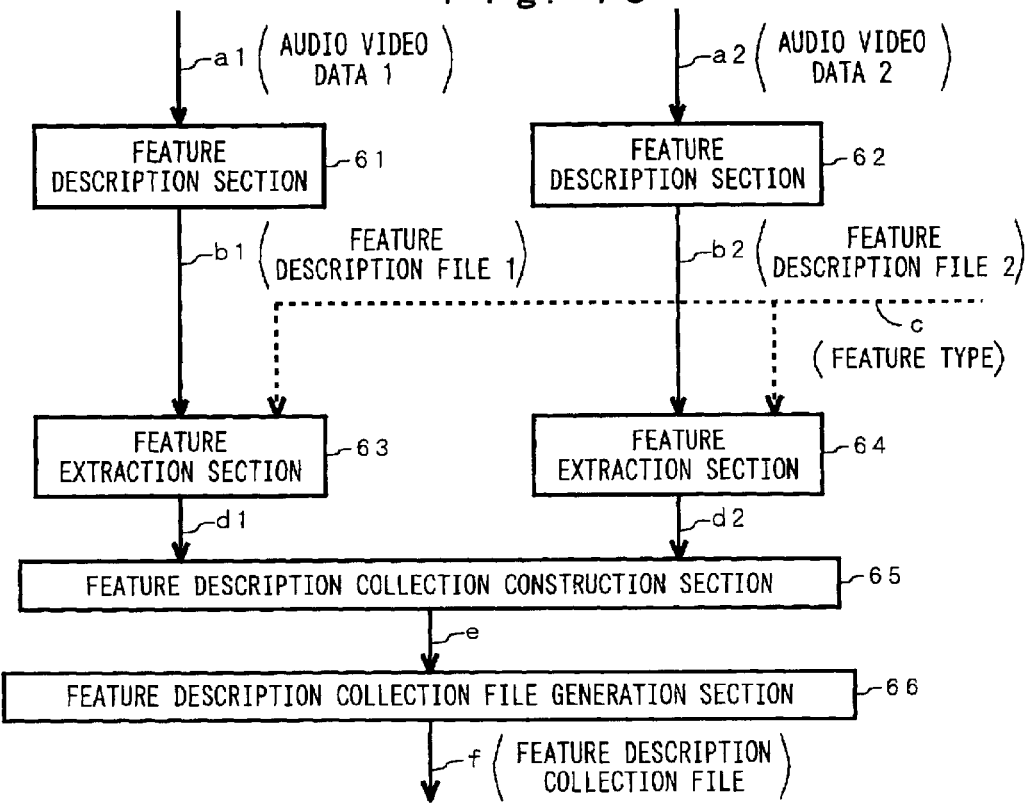
FIG. 13 is a block diagram showing the diagrammatic sketch and a processing flow of another embodiment according to the present invention.

In FIG. 13, feature description sections 61 and 62 describe features for individual audio video data a1 and a 2 (audio video data 1, audio video data 2, . . . ) based on various feature types, and generate feature description files b1 and b2 therefor, respectively. Here, each audio video data may be compressed or uncompressed, and also there may be the case where some audio video data are compressed, and others are uncompressed.

The feature description files b1 and b2 (feature description file 1 and feature description file 2, ) obtained from multiple pieces of audio video data are fed to feature description extraction sections 63 and 64, respectively. The feature description extraction sections 63 and 64 extract corresponding feature descriptions d1 and d2 from the feature description files b1 and b2 based on a certain feature type (c), respectively. Here, the feature type (c) to be extracted may be specified by a user's external input or feature descriptions may be described based on all feature types described in each feature description file. A feature description collection construction section 65 constructs a feature description collection (e) using multiple feature description files d1 and d2, and feeds the extracted feature description collection (e) to a feature description collection file generation section 66. The feature description collection file generation section 66 constructs a description as a feature description collection file using the description method according to the present invention, and generates a feature description collection file (f).

Figure 14:
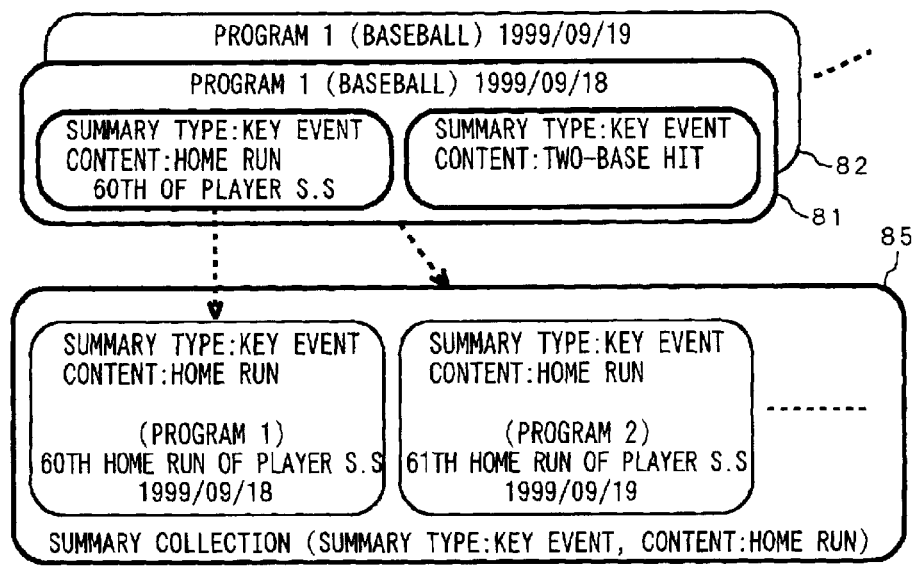
FIG. 14 is a conceptual illustration of a summary collection constructed in a feature description collection construction section shown in FIG. 1.

FIG. 14 shows a concrete example of the feature description collection (e) obtained from the present invention. In this example, the feature type (c) corresponds to a summary type for the individual audio video data a1 and a2, and examples for describing summaries based on a certain summary type (key event, home run) are shown. Summary descriptions are collected based on a targeted summary type from the audio video program collections 81, 82, (program 1, program 2, ) and a summary collection 85 are constructed. For example, summary descriptions "home run" of the summary type are collected and the summary collection 85 consisting of 60th home run, 61st home run, 62nd home run, . . . of a player named S. S is constructed.

Figure 22A:
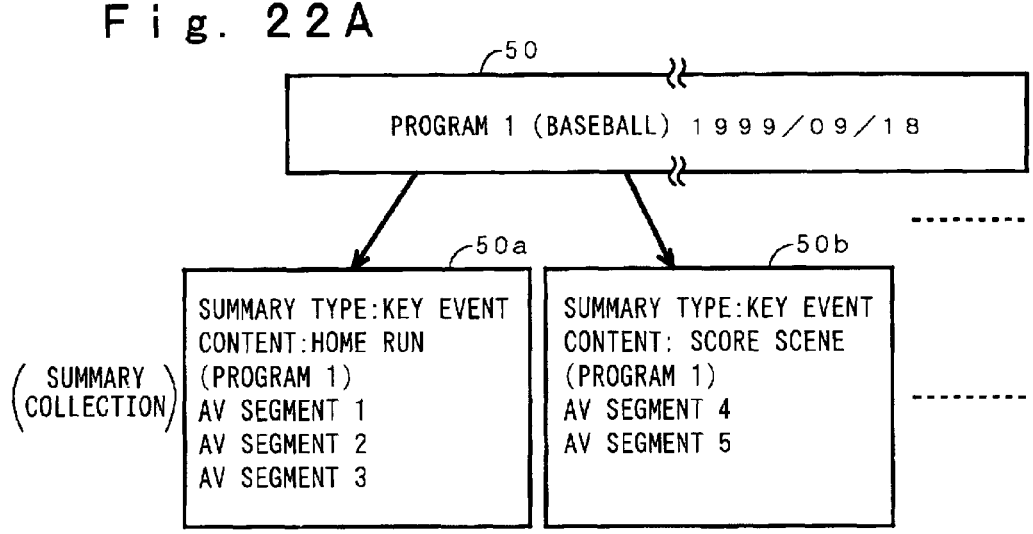
FIG. 22 is illustration for a summary collection generated by the conventional method.
Figure 22B:
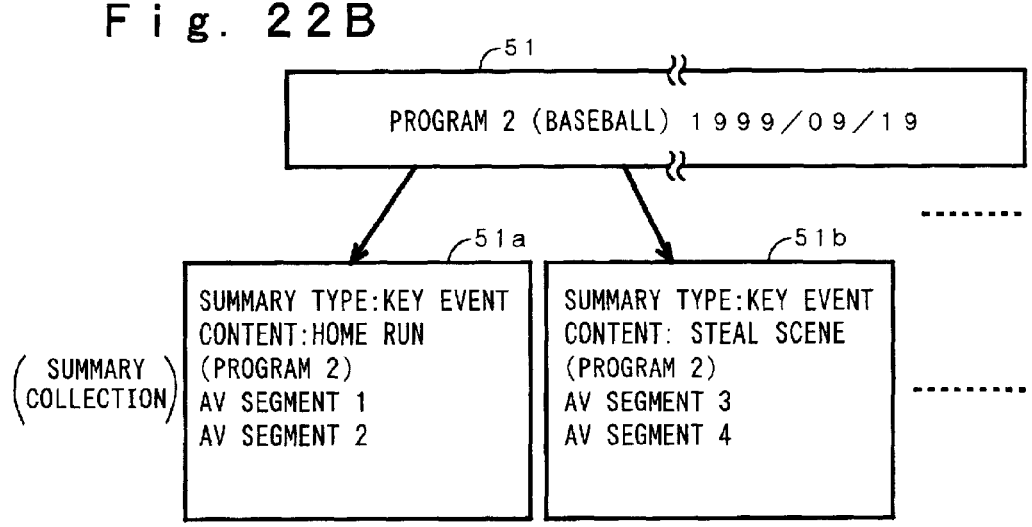

As shown in FIG. 22, a summaries can be conventionally described only based on various summary types (key events, key objects and so on) for individual audio video programs (complete audio video programs). According to the present invention, by contrast, summary descriptions can be collected from multiple audio video programs 81, 82, . . . according to a specific summary type and the summary collection 85 can be thereby constructed and described.

Figures 15A, 15B:
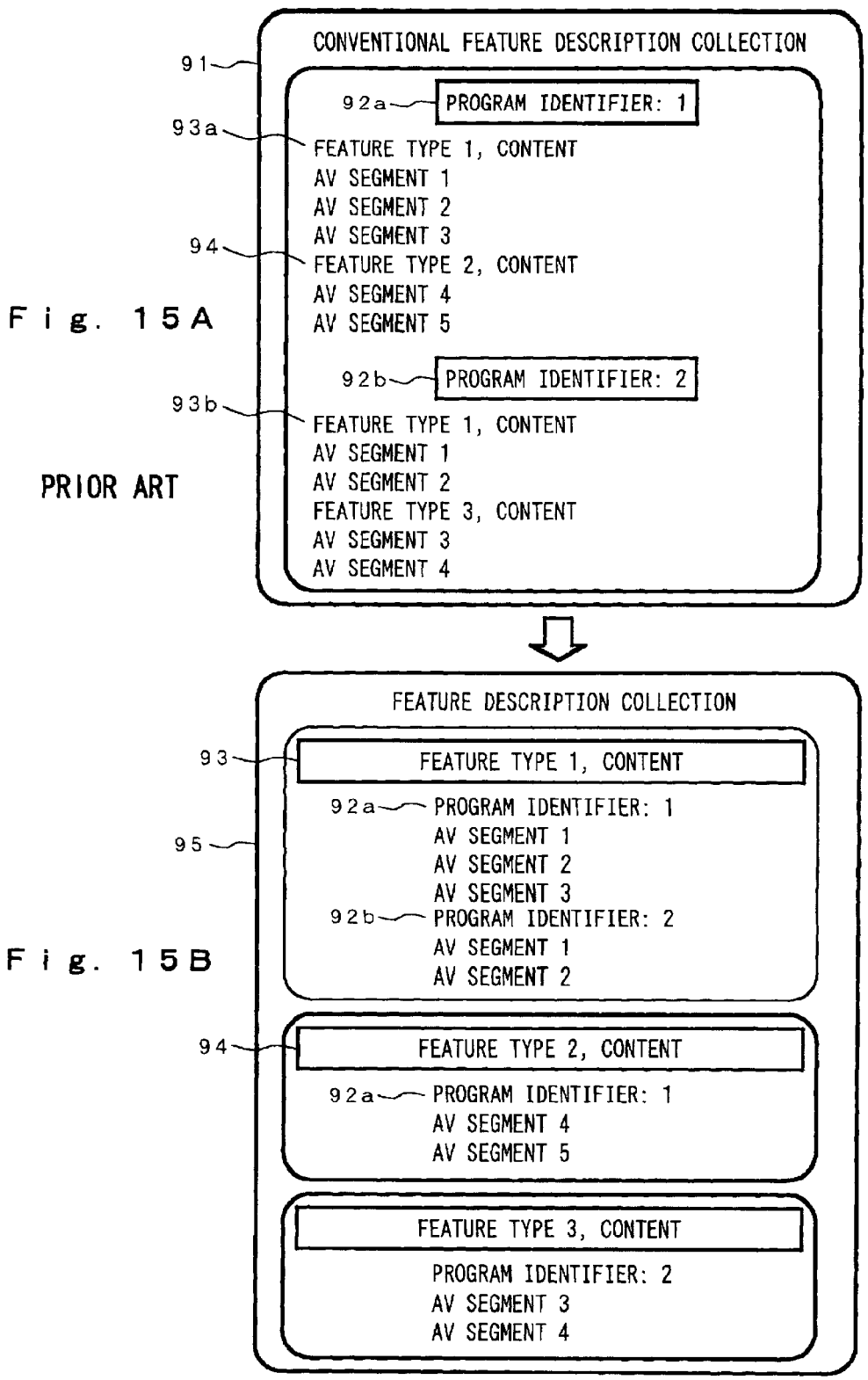
FIG. 15 shows an example of the description contents of feature description collection files obtained by the conventional method and by the method of the present invention.

FIGS. 15A, 15B, 16A and 16B show feature description collections which are described using a conventional feature description method and those according to the present invention. As shown in FIG. 15A, in a conventional feature description collection 91, audio video program identifiers 92*a*, 92*b*, . . . referred to by each feature is described at the highest level and feature types and contents as well as audio video data segments corresponding to the feature are described at the lower level. When the feature description collection 91 is browsed, the feature description collection file thus described is inputted into and parsed by an audio video data browsing system. If, for example, "feature type 1" 93*a*, 93*b*, . . . in the feature description collection are to be browsed, there is no means for determining summaries based on the "feature type 1" 93*a*, 93*b*, . . . are described in the programs represented by which identifiers 92*a*, 92*b*, . . . . Due to this, it is necessary to parse the feature description file 91 thoroughly from the beginning to the end. Further, if it is unclear in which range a reference program belonging to each feature type is valid and if many feature types exist, then it is sometimes difficult to specify the "feature type 1" 93*a*, 93*b*, . . . . In a feature description collection 95 shown in FIG. 15B according to the present invention, by contrast, feature types and contents 93, 94, . . . are described at the highest level and audio video program identifiers 92*a*, 92*b*, . . . referred to by each feature based on the feature types 93, 94, . . . and specified segments are described at a lower level under that of the feature types and contents. Accordingly, if a feature description collection based on a specific feature type and content, e.g., "feature type 1" 93 is to be browsed, it is enough to interpret only the highest level. If the highest level does not conform to the desired feature type and content, the elements are skipped until the next feature type 94. Once a desired feature description collection is searched, parsing can be finished at that point.

Further, since the reference programs 92*a*, 92*b*, . . . are contained for each feature type 93, 94, . . . , a program to be referred to can be easily specified. Further, while two "feature type 1" (93*a*, 93*b*) exist in the conventional feature description collection 91, only one "feature type 1" exists in the feature description collection according to the present invention. It is, therefore, possible to avoid the overlapped description of the feature type 93 and to reduce the size of the feature description collection file. FIGS. 16A and 16B show the same contents as those of FIGS. 15A and 15B in a table form, which description will not given herein.

Figure 17:
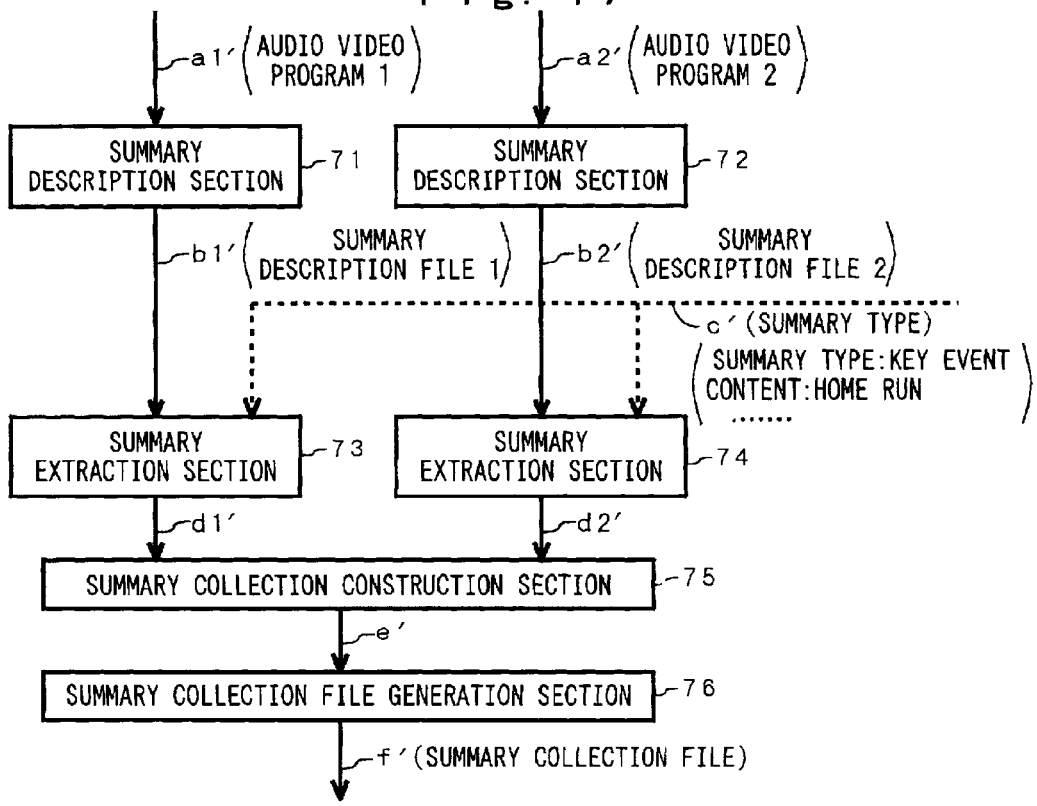
FIG. 17 is a block diagram showing a diagrammatic sketch and a processing flow if a feature type is a summary type shown in FIG. 13.

FIG. 17 shows a construction and a processing flow if the feature type (c) is "summary type (c)'" shown in FIG. 13. In this concrete example, summary description sections 71 and 72 describe the summaries of audio video programs a1' and a2', respectively. Summary description extraction sections 73 and 74 extract summary descriptions d1' and d2' according to a certain summary type (key event, home run, (c)' from summary description files b1' and b2' obtained by the summary description sections 71 and 72, respectively. A summary collection construction section 75 collects these summary descriptions d1' and d2' and constructs a summary collection (e)'. Summary collection file generation section 76 generates a summary collection file (f)' using a summary collection description method according to the present invention.

Figure 18A:
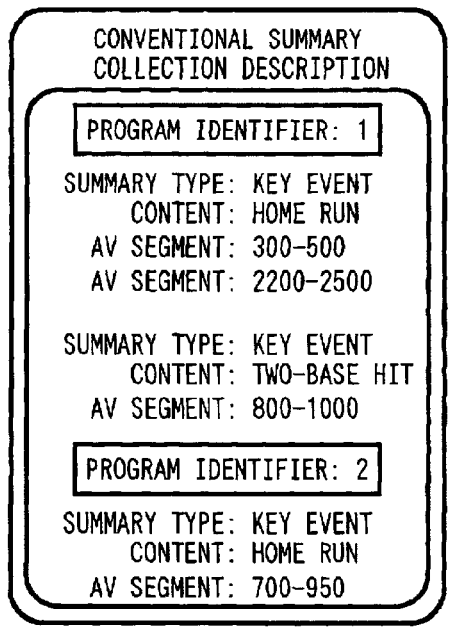
FIG. 18 shows an example of the description contents of summary collection files obtained by the conventional method and by the method of the present invention.
Figure 18B:
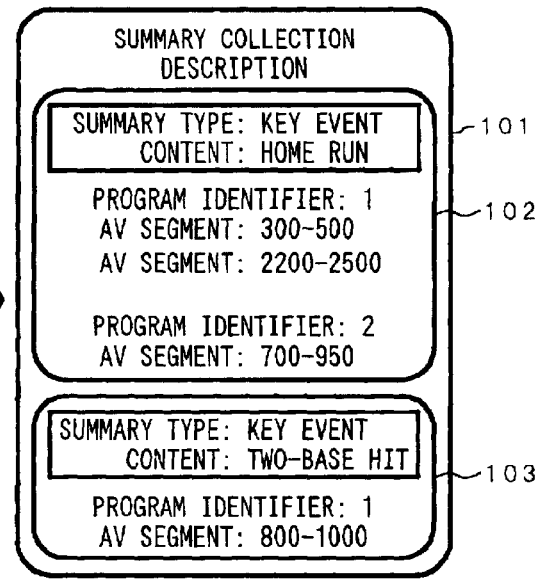

FIG. 18A shows a feature description collection which is described using the conventional feature description method as in the case of FIG. 15A. FIG. 18B shows a feature description collection which is described according to the present invention as in the case of FIG. 15B.

In a summary collection file 101 according to the present invention, the summary type (c)' is set as "summary type: key event, content: home run" in FIG. 17, thereby obtaining the first summary collection 102 from the summary collection construction section 75. Then, the summary type (c)' is set as "summary type: key event, content: two-base hit", thereby obtaining the second summary collection 103 from the summary collection construction section 75. The summary collection file generation section 76 edits the first and second summary collections 102 and 103 into a summary collection file 101 and outputs the file 101. Through the above operations, the summary collection file 101 shown in FIG. 18B can be obtained.

Figure 19A:
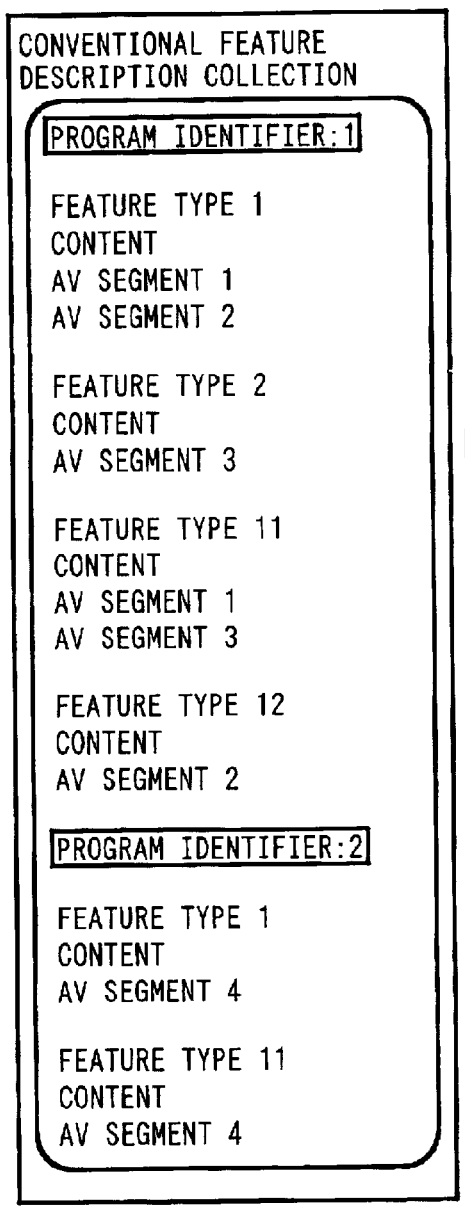
FIG. 19 shows another example of the description contents of the feature description collection files obtained by the conventional method and the method of the present invention.
Figure 19B:
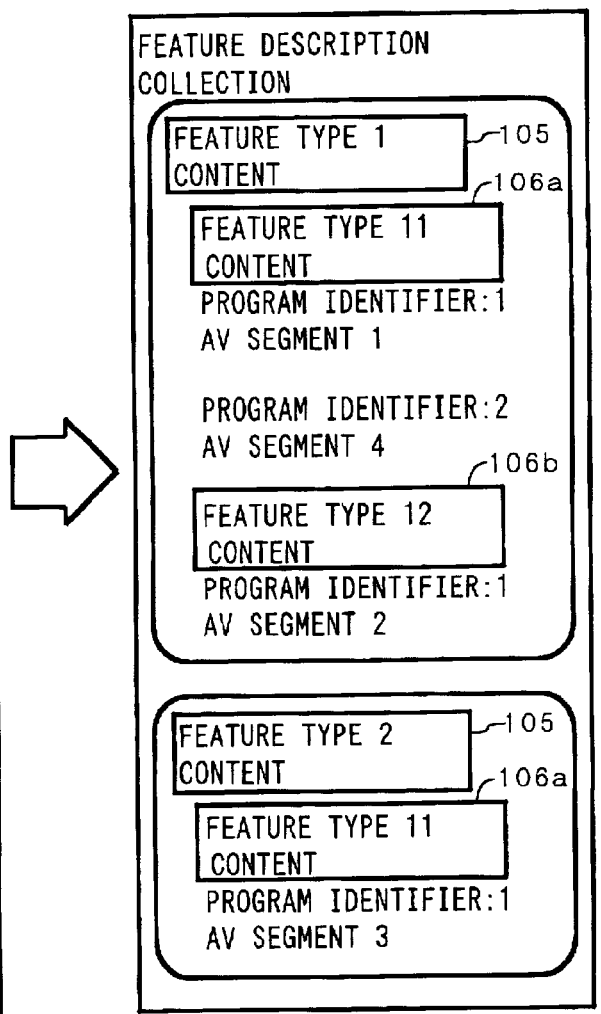

FIGS. 19A and 19B are illustrations for another embodiment according to the present invention. FIG. 19A shows a feature description collection described using the conventional feature description method. FIG. 19B shows a feature description collection described by the method according to the present invention.

As shown in FIG. 19A, in the conventional feature description collection, program identifiers are described at the highest level and corresponding feature types and contents are described in parallel at the same level. According to such a description method, it is difficult to extract a desired feature type by combining multiple feature types and contents.

In the feature description collection according to the present invention shown in FIG. 19B, by contrast, feature types and contents are described altogether and different feature types and contents are inserted in a nested structure, whereby it is possible to generate a feature description collection according to the different feature types or contents for the same feature type.

Figure 20A:
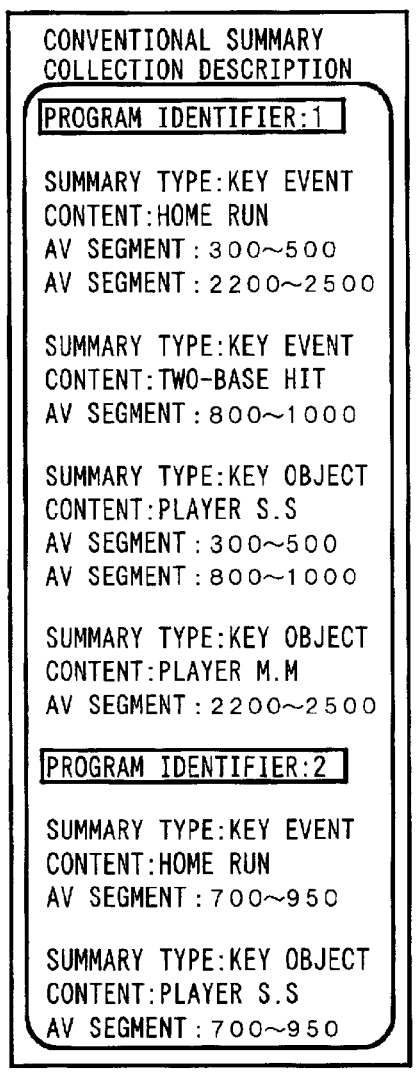
FIG. 20 is illustration if "feature type" shown in FIG. 19 is a "summary type"
Figure 20B:
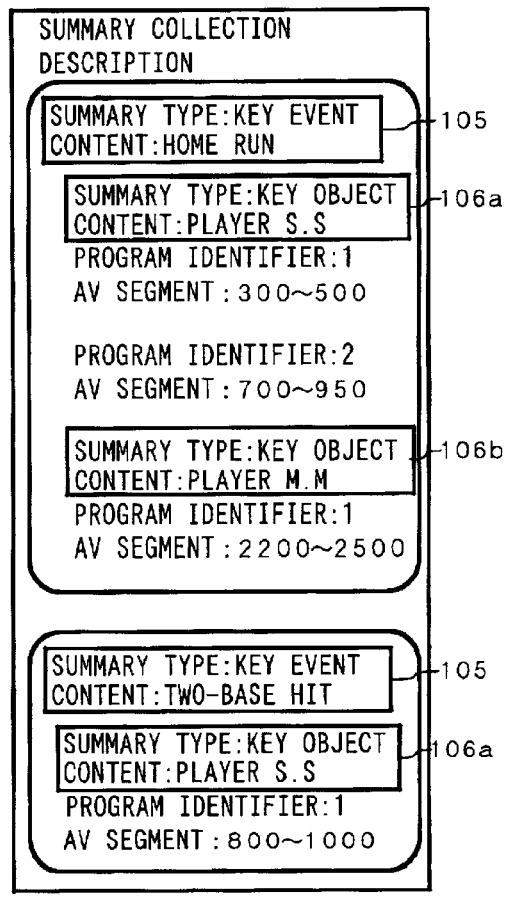

FIGS. 20A and 20B are illustrations if the "feature type" shown in FIG. 19 is "summary type". FIG. 20A shows a feature description collection described using the conventional feature description method and FIG. 20B shows a feature description collection described according to the method of the present invention.

As shown in FIG. 20A, in the conventional summary collection description, program identifiers are described at the highest level and corresponding summary types and contents are described in parallel at the same level. According to such a description method, it is difficult to extract a desired summary description by combining multiple summary types and contents.

In the summary collection description according to the present invention shown in FIG. 20B, by contrast, summary types and contents are described altogether and different summary types and contents are inserted in a nested structure, whereby summaries can be described according to the different summary types or contents for the same summary type. For example, in the example shown in FIG. 20B, summaries are described while nested "key event" 105 and "key objects" 106*a* and 106*b*.

Figure 21:
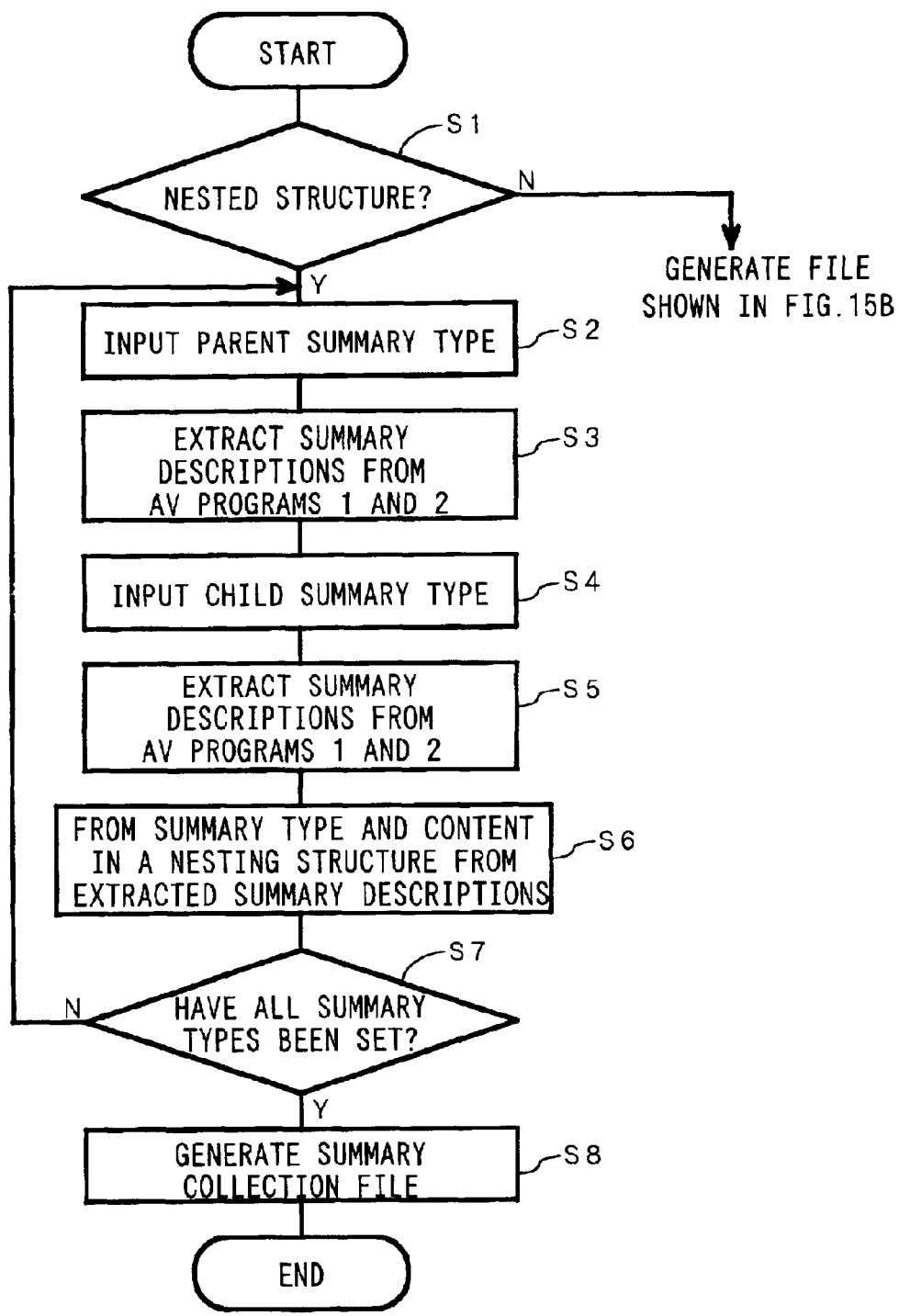
FIG. 21 is a flow chart showing an operation for generating a nested summary collection file.

FIG. 21 is a flow chart showing the outline of the operation of FIG. 17 in this embodiment. In a step S1, it is judged whether or not nested structure is indicated to the summary collection construction section 75. If the judgment result of the step S1 is No, an operation for generating the summary collection file shown in FIG. 15B as already described above is carried out. If the judgment result of the step S1 is Yes, a step S2 follows and a parent summary type (c)' is set. In a step S3, the summary description extraction sections 73 and 74 extract summary descriptions corresponding to the parent summary type (c)' from AV (audio video) programs 1 and 2, respectively. In a step S4, a child summary type (c)' is set. In a step S5, the summary description extraction sections 73 and 74 extract summary descriptions corresponding to the child summary type (c)' from the AV programs 1 and 2, respectively. In a step S6, summary types and contents are nested based on the extracted summary descriptions. In a step S7, it is judged whether or not all summary types have been set. If the judgment result of the step S7 is No, the step S2 follows and the procedures in the steps S2 through S6 are repeated. In this way, one or multiple summary collections with a nested structure are formed. If the judgment result of the step S7 is Yes, a step S8 follows. In the step S8, the summary collection file generation section 76 generates a summary collection file as shown in FIG. 20B.

With such a nested structure, it is possible to efficiently describe summaries based on multiple different summary types and contents, and to intelligently search and browse audio video data.

As is evident from the above description given so far, according to the present invention, feature descriptions from multiple audio video programs are collected according to a specific feature type. Due to this, in case of describing as a feature description collection, the feature descriptions can be represented efficiently and clearly. Further, it is possible to combine multiple feature types and to obtain a desired feature description from the feature description collection.

What is claimed is:

1. A compressed or uncompressed audio data feature description scheme,
   wherein audio features are hierarchically represented by setting entire audio data which corresponds to one audio program at the highest hierarchy and describing the audio features in metadata in order from higher to lower hierarchies, and
   wherein said hierarchies are represented by one or more audio programs having a semantically continuous content and at least either an audio scene or an audio shot.

2. A compressed or uncompressed audio data feature description scheme according to claim 1, wherein
   said hierarchy is described by at least a hierarchy identifier and a feature which includes an audio type, a feature type and audio segment information classified according to the feature types.

3. A compressed or uncompressed audio feature description scheme according to claim 2, wherein
   said audio segment information is described by either of a combination of start time code and end time code, or a combination of start time code and duration.

4. A compressed or uncompressed audio data feature description scheme,
   wherein audio features are hierarchically represented by setting entire audio data which corresponds to one audio program at the highest hierarchy and describing the audio features in metadata in order from higher to lower hierarchies, and
   wherein said hierarchy is described by at least a hierarchy identifier and a feature which includes an audio data type, a feature type and audio segment information classified according to the feature types.

5. A compressed or uncompressed audio data feature description scheme according to claim 4, wherein
   said audio segment information is described by either of a combination of start time code and end time code, a combination of start time code and duration.

6. A compressed or uncompressed audio data feature description scheme, wherein
   an audio program is described through one or more hierarchies;
   an audio feature of each hierarchy is represented by an audio thumbnail indicating either one or more audio pieces or images;
   the audio thumbnail is declared and described as a feature type;
   if the audio thumbnail is the audio pieces, segment information of one or more audio pieces are described; and
   if the audio thumbnail is the images, one or more file names of the images are described.

7. A compressed or uncompressed audio data feature description scheme,
   wherein an audio feature of at least one audio scene or one audio shot is represented by an audio clip which is at least one audio piece having an arbitrary length equal to or shorter than that of the audio scene or the audio shot, respectively,
   said audio scenes and/or audio shots are described through one or more hierarchies, and
   wherein at least one audio clip representing said audio scenses or audio shots is represented as the key audio clip.

8. A compressed or uncompressed audio data feature description scheme according to claim 7,
   wherein the key audio clip is declared and described as a feature type;
   if an audio type of the key audio clips is voice or speech, a voice or a speech representing the key audio clips is represented as the key word and the content of the key word is described by textual information;
   the key word is declared and described as a feature sub type; and
   at least one audio segment corresponding to the key word is described.

9. A compressed or uncompressed audio feature description scheme according to claim 7,
   wherein the key audio clip is declared and described as a feature type;
   if an audio data type of the key audio clips is music, a music representing the key audio clips is represented as the key note;
   the key note is declared and described as a feature sub type; and
   at least one audio segment corresponding to the key note is described.

10. A compressed or uncompressed audio data feature description scheme wherein at least one audio clip representing said audio scenes or audio shots is represented as the key audio clip according to claim 7,
wherein the key audio clip is declared and described as a feature type;
if an audio type of the key audio clips is sound, a sound representing the key audio clips is represented as the key sound;
the key sound is declared and described as a feature sub type; and
at least one audio segment corresponding to the key sound is described.

11. A compressed or uncompressed audio data feature description scheme, wherein
if audio data consists of multiple channels or tracks, a representative channel or track of the audio data is represented as the key stream;
the key stream is declared and described as a feature type; and
at least one audio segment corresponding to the key stream is described.

12. A compressed or uncompressed audio data feature description scheme, wherein
an audio clip representing an event in audio data is represented as the key event;
the key event is declared and described as a feature type;
a content of the key event is described by textual information; and
at least one audio segment corresponding to the key event is described.

13. A compressed or uncompressed audio data feature description scheme, wherein
an audio clip from a representative audio source in audio data is represented as the key object;
the key object is declared and described as a feature type;
a content of the key object is declared and described by textual information; and
at least one audio segment corresponding to the key object is described.

14. A compressed or uncompressed audio data feature description scheme, wherein
an audio program is described through one or more hierarchies;
at least one introduction or representative audio piece of each hierarchy corresponding to an audio program, an audio scene or an audio shot is represented as an audio segment;
a sequence of the audio segments is represented as an audio slide;
the audio slide is declared and described as a feature type; and
the audio segments composing the audio slide are described.

15. A compressed or uncompressed audio data feature description scheme, wherein
an audio program is described through one or more hierarchies;
at least one introduction or representative audio piece of each hierarchy corresponding to an audio program, an audio scene or an audio shot is saved as an audio file;
a sequence of the audio files is represented as an audio slide;
the audio slide is declared and described as a feature type; and
file names of the audio files composing the audio slide are described.

16. A compressed or uncompressed audio data feature description scheme, wherein
if a feature type is any of a shot, a key audio clip, a key word, a key note, or a key sound, value indicating level of the feature types is described; and
multiple audio data with said feature types are described hierarchically according to the level values.

17. A compressed or uncompressed audio video data feature collection description scheme, wherein
feature descriptions based on various feature types are associated with each audio video program;
the feature descriptions are extracted from multiple audio video programs based on a specific feature type;
a feature collection description is constructed by using multiple extracted feature descriptions; and
the feature collection description is described as a feature collection description file.

18. A compressed or uncompressed audio video data feature collection description scheme according to claim 17, wherein
the feature type is a summary type;
summary descriptions associated with each audio video programs are extracted from multiple audio video programs based on a specific summary type;
a summary collection is aggregated using multiple extracted summary descriptions; and
the summary collection is described as a summary collection description file.

19. A compressed or uncompressed audio video data feature collection description scheme according to claim 18, wherein
the summary types for summary collection descriptions and contents of the summary types are described altogether in a nested structure, whereby the summary collection can described based on different summary types, or based on different contents among the same summary type.

20. A compressed or uncompressed audio video data feature collection description scheme according to claim 17, wherein
as an element for describing the feature collection description in the feature collection description file, the feature types for feature collection descriptions and contents of the feature types are described at a higher level; and
the audio video program identifiers referred to by each feature description and each corresponding segment information in the audio video programs are described.

21. A compressed or uncompressed audio video data feature collection description scheme according to claim 20, wherein
if the feature is a summary of audio video data, summary types for summary collection and contents of the summary types are described at a higher level as an element for describing the summary collection in the summary collection file;
the audio video program identifiers referred to by each summary description and each corresponding segment information in the audio video programs are described at a lower level.

22. A compressed or uncompressed audio video data feature collection description scheme according to claim 21, wherein the summary types for summary collection descriptions and contents of the summary types are described altogether in a nested structure, whereby the summary collection can described based on different summary types or based on different contents among the same summary type.

23. A compressed or uncompressed audio video data feature collection description scheme according to claim 20, wherein the feature types for feature collection descriptions and contents of the feature types are described altogether in a nested structure, whereby the feature collection can be described based on different feature types, or based on different contents among the same feature type.

24. A compressed or uncompressed audio video data feature collection description scheme according to claim 17, wherein the feature types for feature collection descriptions and contents of the feature types are described altogether in a nested structure, whereby the feature collection can be described based on different feature types, or based on different contents among the same feature type.

* * * * *